United States Patent [19]

Nishizawa

[11] Patent Number: 5,383,265
[45] Date of Patent: Jan. 24, 1995

[54] METHOD FOR FIXING FG MAGNET

[75] Inventor: Hiroshi Nishizawa, Hanamaki, Japan

[73] Assignee: Matsushita Electric Industrial Co., Ltd., Osaka, Japan

[21] Appl. No.: 215,656

[22] Filed: Mar. 22, 1994

Related U.S. Application Data

[63] Continuation of Ser. No. 887,843, May 26, 1992, abandoned.

[30] Foreign Application Priority Data

Jun. 4, 1991 [JP] Japan .................................. 3-132899

[51] Int. Cl.⁶ ............................................. H02K 15/02
[52] U.S. Cl. ........................................ 29/598; 29/608;
264/272.19; 264/274; 310/42; 310/156
[58] Field of Search ..................... 29/598, 608;
264/272.19, 272.2, 108, 274; 310/43, 44, 156

[56] References Cited

U.S. PATENT DOCUMENTS

| | | | |
|---|---|---|---|
| 4,117,071 | 9/1978 | Hannah | 264/274 X |
| 4,403,402 | 9/1983 | Tomite et al. | 29/598 |
| 4,796,354 | 1/1989 | Yokoyama et al. | 29/608 |

FOREIGN PATENT DOCUMENTS 241695 2/1990 Japan .
256796 2/1990 Japan .

Primary Examiner—Carl E. Hall
Attorney, Agent, or Firm—Stevens, Davis, Miller & Mosher

[57] ABSTRACT

A method for fixing an FG magnet to a rotor frame of a motor. An FG magnet containing a plastic magnet is charged into a recessed portion provided on the outer peripheral surface of the rotor frame, whereby it is fixed thereto as it is monolithically formed to be engaged therein. In this manner, the FG magnet may be fixed to the rotor frame without exceeding the thickness of the rotor frame.

4 Claims, 2 Drawing Sheets

METHOD FOR FIXING FG MAGNET

This application is a continuation of application Ser. No. 07/887,843, filed May 26, 1992 (abandoned).

BACKGROUND OF THE INVENTION

1. Field of the Invention

The present invention relates to methods for fixing an FG magnet used in a rotation frequency detector for the detection of rotation frequency of a drive motor for example in a floppy disk device.

2. Description Of the Prior Art

In known methods for fixing an FG (frequency generator) magnet in this type of rotation frequency detector, the FG magnet and a rotor frame are fixed to each other such that: the gap formed between the FG magnet and the rotor frame is charged for example with adhesives; a hole is bored through the rotor frame; or the rotor frame is sandwiched.

FIG. 4 shows a section of a conventional fixing method for the FG magnet by means of adhesion. Referring to FIG. 4, numeral 2 denotes a rotor frame and numerals 30 and 30' denote forced out adhesives which must be removed.

FIG. 5 shows a section of a fixing method for the FG magnet based on conventional monolithic forming. Since, in this configuration, the gap between a substrate 11 and the lower surface 3' of the FG magnet is reduced as the rotor frame 2 is to be sandwiched, the rotor frame must be raised in height as a whole and the thickness of the motor is increased.

In the above described conventional fixing methods for the FG magnet, there are such problems as that:

(1) in the case of using adhesives, it is necessary to hold and stabilize the FG magnet and the rotor until the adhesives are firmly fixed, and, in addition, adhesives that are forced out from the rotor frame must be removed;

(2) in the case of boring a hole through the rotor frame, leakage flux of the main magnet is increased; and (3) in the case of forming the FG magnet so as to sandwich the rotor frame, the thickness of the FG magnet in the direction of its height exceeds that of the rotor frame and the motor as a whole cannot be made thinner.

SUMMARY OF THE INVENTION

This invention has been made to solve the prior problems as described and its object is to provide a fixing method for an FG magnet in which the FG magnet in a rotation frequency detector is fixed without using adhesives and its thickness may be less than that of the rotor frame thereof.

To achieve the above described object, the present invention is provided such that the outer peripheral surface of a rotor frame of a motor is formed with a recessed portion that is shallower than the plate-thickness of the rotor frame, and an FG magnet is fixed to the rotor frame by monolithically forming so that a plastic magnet is charged into the recessed portion to be engaged therein.

Further, 60 wt% to 90 wt% strontium ferrite in terms of weight percentage is used as the material for the FG magnet to obtain a sufficient output of FG and to prevent a crack due to thermal stress.

Furthermore, as the FG magnet is engaged by the recessed portion, the FG magnet may be formed without exceeding the height of the rotor frame.

According to the present invention, a recessed portion shallower than the plate-thickness of the rotor frame is provided on the outer peripheral surface of the rotor frame, and a plastic magnet which will form an FG magnet is charged into this recessed portion. Thereby, there is an advantage that the FG magnet and the rotor frame are firmly fixed to each other without using adhesives. Further, since the FG magnet may be formed and fixed without exceeding the height of the rotor frame due to the fact that a recessed portion is provided on the outer peripheral surface of the rotor frame, it is possible to reduce the thickness of the motor as a whole.

DETAILED DESCRIPTION OF THE PREFERRED EMBODIMENTS

Figure 1:
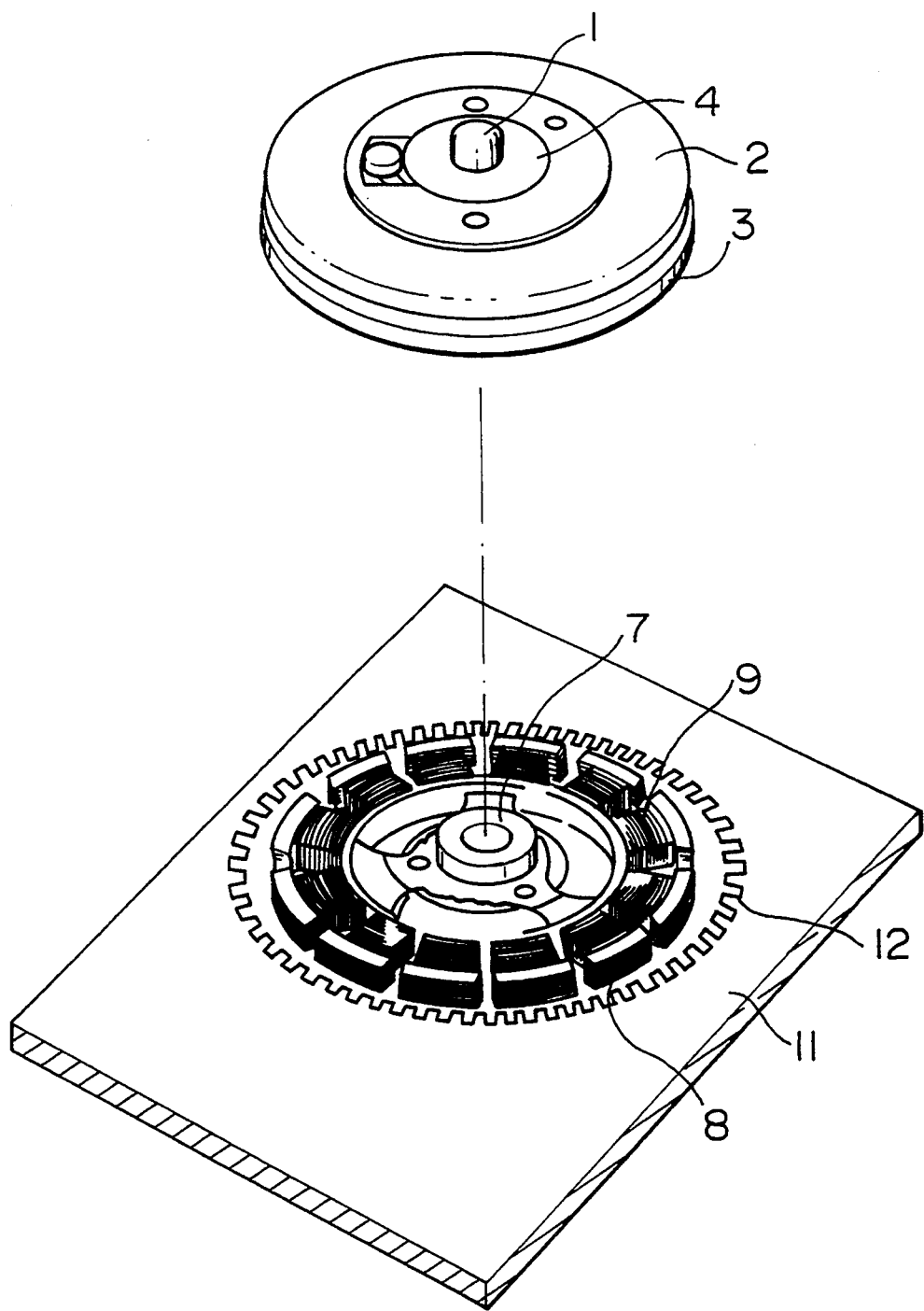
FIG. 1 is an exploded perspective view of a drive motor having a rotation frequency detector using an FG magnet according to the present invention.

FIG. 1 is an exploded perspective view showing the overall structure of a drive motor having a rotation frequency detector used, for example, in a floppy disk device according to the present invention. Referring to FIG. 1, denoted by numeral: 1 is a shaft; 2 is a circular rotor frame illustrated as removed having a downwardly projecting collar; 3 is an FG (frequency generator) magnet formed of a plastic magnet to be fixed at the outer periphery of the downwardly projecting collar portion of the rotor frame 2; 3' is the lower surface of the FG magnet 3; 3" is the engaging portion of the FG magnet 3; 4 is a boss for connecting the shaft 1 to the rotor frame 2; 5 is a recessed portion provided on the outer peripheral surface of the rotor frame 2; 7 is a bearing for supporting the rotation of the shaft 1; 8 is a stator arranged radially around the bearing 7; 9 is a coil wound around a stator 8; 10 is a main magnet positioned inside the peripheral surface of the rotor frame 2; 11 is a substrate on which such as the bearing 7, stator 8, and coil 9 are arranged; and 12 is a zigzag pattern which will serve as an FG coil for generating a voltage, provided on the substrate 11 in a manner opposing the main magnet 10. Further, the material of the FG magnet 3 is 60 wt% to 90 wt% strontium ferrite in terms of weight percentage.

Figure 2:
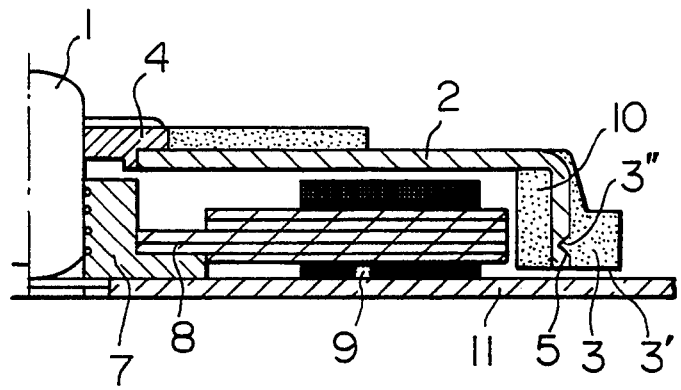
FIG. 2 is a sectional view of certain portions of the rotation frequency detector portion as shown in FIG. 1 according to an embodiment of the present invention.

FIG. 2 is a sectional view taken along the center line of the shaft 1 of the rotation frequency detector as shown in FIG. 1. Here, only the portion along a radius thereof is shown to illustrate the fixing method of the FG magnet in a first embodiment of the present invention.

Referring to FIG. 2, the shaft 1 is connected to the rotor frame 2 via the boss 4 and the shaft 1 is supported at the bearing 7 which is supported on the substrate 11 so as to be guided in rotation. When a current is conducted through the coil 9, an electromagnetic force is generated with the main magnet 10 to rotate the rotor frame 2. FG magnetization for detecting rotation frequency is applied to the lower surface 3' of the FG magnet 3. A voltage having a frequency proportional to the rotation frequency is generated in accordance with Fleming's right-hand rule with the FG coil 12 of the zigzag pattern provided on the substrate 11, which is extracted as an FG signal to detect the rotation frequency of the rotor. The recessed portion 5 provided on the outer peripheral surface of the downwardly projecting portion of the rotor frame 2 engages the engaging portion 3'' of the FG magnet 3.

As described, according to the first embodiment, since the recessed portion 5 provided on the outer peripheral surface of the rotor frame 2 is filled with the FG magnet 3 which is formed of a plastic magnet and the engaging portion 3'' thereof is engaged by the recessed portion 5, the rotor frame 2 and the FG magnet 3 may be fixed to each other without using adhesives. Further, since the recessed portion 5 is positioned on the outer peripheral surface of the rotor frame 2 on the way of the height thereof, the lower surface 3' of the FG magnet 3 is not required to hold the rotor frame 2 in a sandwiching manner. The thickness of the FG magnet, therefore, does not exceed the thickness of the rotor frame 2 and the motor may be reduced in its thickness.

Figure 3:
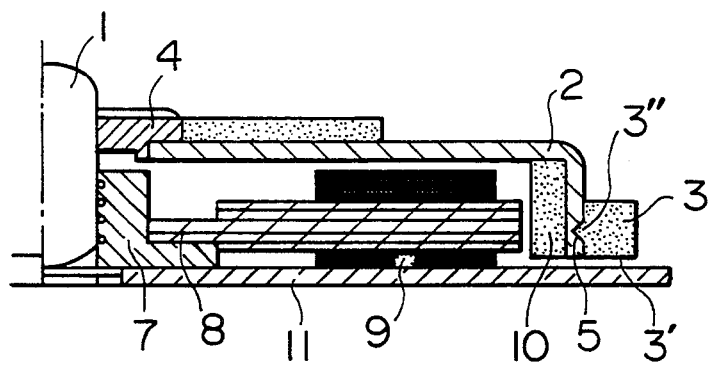
FIG. 3 is a sectional view of certain portions similar to that as shown in FIG. 2 according to another embodiment of the present invention.
Figure 4:
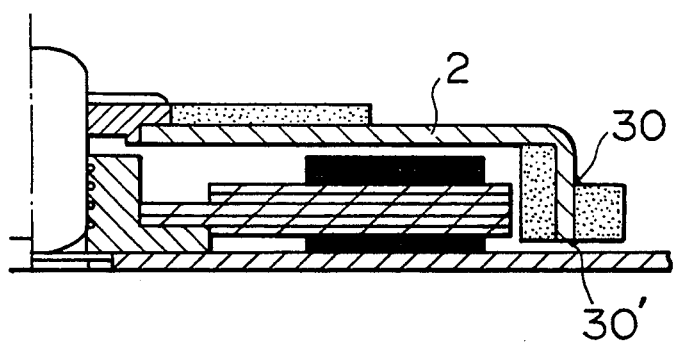
FIG. 4 is a sectional view of certain portions similar to that as shown FIG. 2 of a conventional rotation frequency detector.
Figure 5:
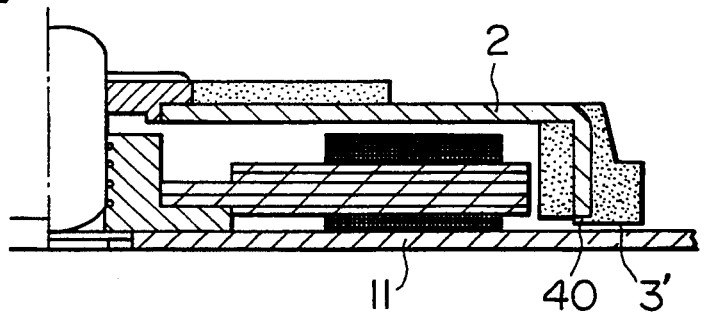
FIG. 5 is a sectional view of certain portions of another conventional rotation frequency detector.

FIG. 3 shows the configuration of an FG magnet fixing method in a motor according to another embodiment of the present invention. In FIG. 3, those identical components as in FIG. 1 are denoted by identical reference numerals. This embodiment exemplifies the case where the FG magnet 3 is constructed to have its thickness thinner than the rotor frame 2. In this case, the space created above the FG magnet 3 may be advantageously used.

As is apparent from the above described two embodiments, since the swing and the size such as height of the FG magnet are determined by its mold, the accuracy thereof may be improved without increasing cost comparing for example to one based on a conventional adhesion.

As is apparent from the above described embodiments, the present invention is constructed such that a recessed portion shallower than the plate-thickness of the rotor frame is provided on the outer peripheral surface of the rotor frame and a plastic magnet is charged into this recessed portion. Since the plastic magnet charged into the recessed portion engages the recessed portion, there is an advantage that the FG magnet may be fixed without adhesion by monolithically forming the FG magnet and the rotor frame. Further, since the above described recessed portion serves as the engaging portion, it is not necessary to have an arrangement for sandwiching the rotor frame. The thickness of the rotor magnet may thus be reduced because it does not exceed the thickness of the rotor frame, resulting in an advantage that the motor may be reduced in thickness.

In addition, since the accuracy of swing and height of the FG magnet may be determined by mold as it is monolithically formed, there is another advantage that it may be implemented without increasing costs.

What is claimed is:

1. A method for fixing an FG magnet to a rotor frame of a motor without an adhesive and in a manner that said FG magnet does not extend beyond upper and lower bounds of said rotor frame, said method comprising the steps of:

providing a recessed portion shallower than a plate-tickness of said rotor frame on an outer peripheral surface of said rotor frame; and monolithically forming the FG magnet around the outer periphery of said rotor frame by applying to said outer peripheral surface a plastic magnet which will form the FG magnet, said plastic magnet being applied so that said FG magnet will not extend beyond said upper and lower bounds of said rotor frame and so that at least a portion of said plastic magnet will fill said recessed portion.

2. A method for fixing an FG magnet according to claim 1, wherein the material of the FG magnet is 60 wt% to 90 wt% strontium ferrite in terms of weight percentage.

3. A method for fixing an FG magnet according to claim 1, wherein the height of the FG magnet is less than the height of the rotor frame.

4. A method for fixing an FG magnet according to claim 1, wherein the rotor frame is a rotor frame of a motor of a floppy disk drive.

* * * * *